United States Patent
Malca

(10) Patent No.: US 10,110,705 B2
(45) Date of Patent: Oct. 23, 2018

(54) SYSTEM AND METHOD FOR PROVIDING ALTERNATE CONTENT DOWNLOADS

(71) Applicant: RED SPARK, LP, Philadelphia, PA (US)

(72) Inventor: Gabriel Malca, Cote-Saint-Luc (CA)

(73) Assignee: Red Spark, LP, Philadelphia, PA (US)

( * ) Notice: Subject to any disclaimer, the term of this patent is extended or adjusted under 35 U.S.C. 154(b) by 343 days.

(21) Appl. No.: 14/622,633

(22) Filed: Feb. 13, 2015

(65) Prior Publication Data
US 2015/0234892 A1    Aug. 20, 2015

Related U.S. Application Data

(60) Provisional application No. 61/939,840, filed on Feb. 14, 2014.

(51) Int. Cl.
*H04L 29/06* (2006.01)
*H04L 29/08* (2006.01)

(52) U.S. Cl.
CPC .............. *H04L 67/42* (2013.01); *H04L 67/02* (2013.01); *H04L 67/28* (2013.01); *H04L 67/2814* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 2005/0198493 A1* | 9/2005 | Bartas | H04W 4/001 713/154 |
| 2009/0187486 A1* | 7/2009 | Lefenfeld | G06Q 30/02 705/14.73 |
| 2012/0210443 A1* | 8/2012 | Blaisdell | G06F 21/12 726/27 |
| 2013/0036154 A1* | 2/2013 | Chhaparia | G06F 17/30867 709/202 |
| 2014/0351041 A1* | 11/2014 | Brown | G06O 30/0246 705/14.45 |
| 2015/0007167 A1* | 1/2015 | Mody | G06F 8/61 717/176 |
| 2015/0207800 A1* | 7/2015 | Jitkoff | H04L 63/102 726/4 |

* cited by examiner

*Primary Examiner* — Alex Gofman
*Assistant Examiner* — Umar Mian
(74) *Attorney, Agent, or Firm* — Volpe and Koenig, P.C.

(57) ABSTRACT

A system and method is described herein for providing alternate software in response to a request for software by a user of a client device. The method may include receiving data associated with a request for content from a client device. The data associated with the request for content may be parsed by a processor, and then the processor may determine whether the parsed data is associated with a request for initial software. If the parsed data is associated with the request for initial software, the processor may substitute the request for initial software with an alternate request for alternate software, which is different from the initial software. Finally, the alternate request for alternate software may be sent or displayed to the client device so that the user may then be redirected to a location to download the alternate software or request a download of the alternate software.

18 Claims, 6 Drawing Sheets

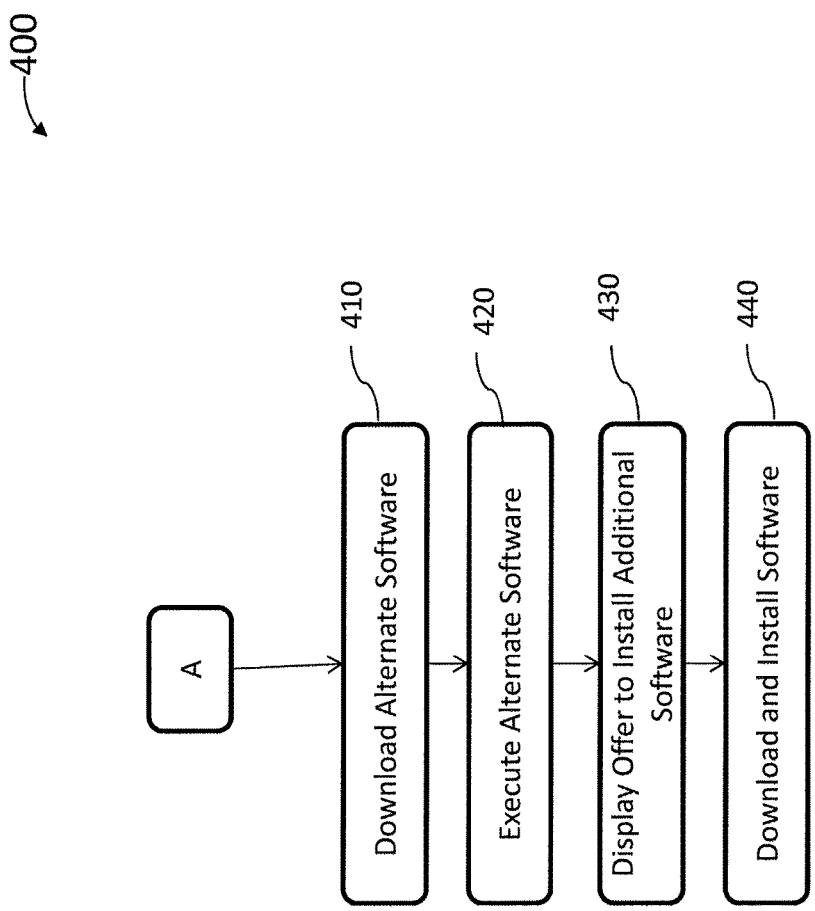

SYSTEM AND METHOD FOR PROVIDING ALTERNATE CONTENT DOWNLOADS

CROSS REFERENCE TO RELATED APPLICATIONS

This application claims the benefit of U.S. Provisional Application No. 61/939,840 filed Feb. 14, 2014, the content of which is hereby incorporated by reference herein.

FIELD OF THE INVENTION

The present invention generally relates to downloading content and, more particularly, to a system and method for providing alternate content downloads to users.

BACKGROUND

Advertisers of various products across diverse industries are constantly seeking to differentiate themselves and, in the process, find new and creative opportunities to present advertisements offers to consumers. Conversely, creators of intellectual property and other content (software, applications, websites, etc.) are constantly seeking for ways to monetize their assets, often through advertising associated with their content, and to attract more customers and end users. Furthermore, creators of desktop, mobile, tablet, and other software products often seek to identify the best way, time, and place to present potential customers with offers to download and install their software that reduces the number of steps and complexity to convert a user from viewing an advertisement to installing the advertised software.

Currently, various technologies and methods exist in the advertising and marketing industry to connect software makers with advertising partners and end users. For example, in order to promote their products and increase their user base, software makers may advertise their products by partnering with search engine publishers to improve the visibility for their product in search engine results by paying for links to their products (e.g., software applications) to appear as one of the top search results when potential customers search for certain key words using the search engine.

Software companies may also advertise their products on websites likely to have users interested in their software, such as technology websites. Some websites, commonly referred to as download portals, have large libraries of software offered to users for free and may present those users with offers to download other software while on the website or during the installation process of the free software. Software companies may promote their software products by offering their software as a free download on such portals, or by offering their software as one of the offers in conjunction with other software available through the portal.

While existing business models, such as those described above, provide software companies with a number of options for marketing their products to end users, they focus mainly on providing revenue to website publishers and advertising channels, but not necessarily to software makers themselves. Accordingly, a need exists for technology that addresses the need of software makers to monetize their software assets by creating new opportunities for software makers to present software product offers to end users, such as by utilizing existing, direct relationship with the end users through software already present on their computers or through interactions with end users as they explore software offerings.

SUMMARY

A system and method is described herein for providing alternate software in response to a request for software by a user of a client device. The method may include receiving data associated with a request for content from a client device. The data associated with the request for content may be parsed by a processor, and then the processor may determine whether the parsed data is associated with a request for initial software. If the parsed data is associated with the request for initial software, the processor may provide an alternate software or software recommendation by substituting the request for initial software with an alternate request to alternate software, which is different from the initial software. Finally, the alternate request to alternate software may be sent or displayed to the client device so that the user may then be redirected to a location to download the alternate software or request a download of the alternate software.

BRIEF DESCRIPTION OF THE DRAWINGS

The foregoing summary, as well as the following detailed description of embodiments of the system and method, will be better understood when read in conjunction with the appended drawings of an exemplary embodiment. It should be understood, however, that the invention is not limited to the precise arrangements and instrumentalities shown.

In the drawings:

FIG. 4 is a flow diagram that illustrates an exemplary method for installing software according to at least one embodiment of the present invention.

DETAILED DESCRIPTION OF THE INVENTION

Figure 1A:
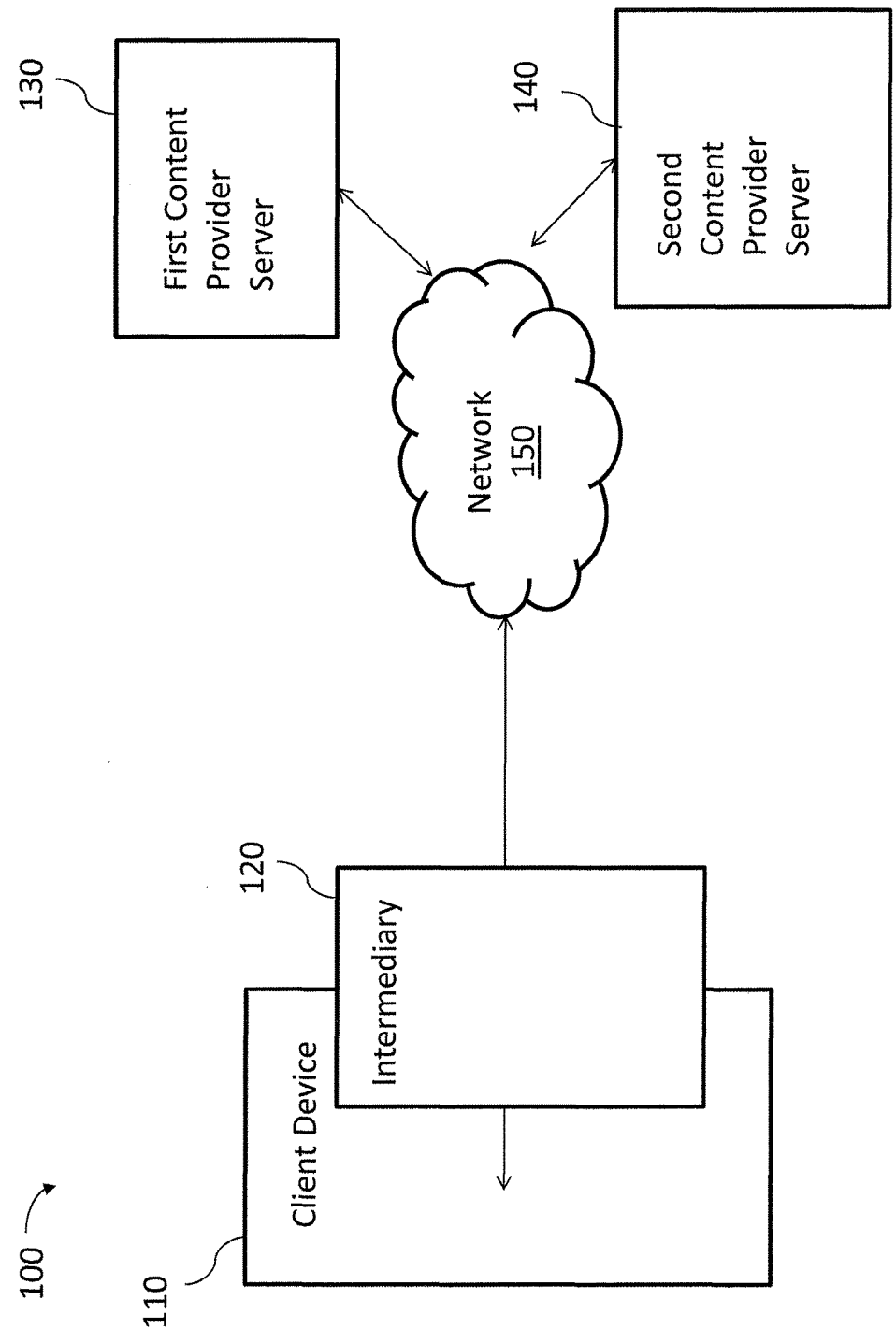
FIG. 1A is a block diagram that illustrates an exemplary system for providing alternate content downloads according to at least one embodiment of the present invention.

At least some embodiments of the present invention alleviate the need to contact Internet properties, such as websites, app stores, and proprietary portals in advance to advertise or otherwise promote their additional software in connection with the software available through such Internet property. Instead, such embodiments allow for the offering of additional or alternate software, along with other advertisements and offers, directly to consumers when consumers attempt to download certain software packages from Internet properties, without requiring any prior relationship or arrangement with the property. Embodiments of the invention also simplify the process for downloading software, which makes customers more inclined to take advantage of offers to download alternate or additional software. Embodiments of the invention also provide a mechanism for software companies and others to monetize their assets with advertising revenue while also providing an additional marketing channel to advertisers, including software companies seeking to promote their products.

Referring to the drawings in detail, wherein like reference numerals indicate like elements throughout, there is shown in FIGS. 1-4, a system and methods for providing alternate content downloads to users, generally designated, in accordance with an exemplary embodiment of the present invention.

FIG. 1A is a block diagram that illustrates a system 100 for providing alternate content downloads according to at least one embodiment of the present invention. In at least one embodiment, the system 100 may include one or more computers or servers, non-transitory memory operable to store one or more computer programs and one or more processors to implement the one or more computer programs. For example, FIG. 1 shows a client device 110, an intermediary 120, a first content provider server 130 and a second content provider server 140. Each of the devices and servers 110, 120, 130 and 140 shown in FIG. 1 may be connected by a network 150. Network 150 may connect one or more devices or servers of system 100, such as the internet or World Wide Web using one or more protocols, such as transmission control protocol/internet protocol (TCP/IP), for example.

In at least one embodiment, a client device 110 may be any computing device, such as a phone, tablet, computer, smart phone, or a smart device. In at least one embodiment, the first content provider server 130 or second content provider server 140 may be an app store, proprietary content portal or server, or web server, or generally a system or method of browsing, requesting, and consuming content over a network.

In at least one embodiment, first content provider server 130 and second content provider server 140, using one or more processors and storage media, may receive and process requests for content or software from any device connected to network 150, such as client device 110, and transmit such content or software to any device connected to network 150, such as client device 110, via one or more protocols, such as the hypertext transfer protocol (HTTP), for example. Examples of content and software include without limitation web page data, HTML, text, video, picture, software, executable, interpretable, byte-code, and binary files. First content provider server 130 and second content provider server 140 may include one or more datastores to store the web pages, software files or any other types of data files. First content provider server 130 and second content provider server 140 may retrieve the web pages, software files or any other types of data files from the one or more datastores before transmitting to any device connected to network 150, such as client device 110.

In at least one embodiment, the intermediary 120 is a software or hardware component implemented by a processor on one or more computers that monitors content transmitted between client device 110 and first content provider server 130. In at least one embodiment, the intermediary 120 receives or captures the content transmitted between client device 110 and first content provider server 130. In at least one embodiment, the intermediary 120 substitutes at least a portion of the content with other content or redirects a request for content (e.g., a URL for an executable file) to second content provider server 140. A request for content may be or include a reference to content, such as a URL, or may be another form of association with or channel to content. In at least one embodiment, the intermediary substitutes or provides recommendations for alternate content based on one or more conditions and/or events.

In at least one embodiment, the intermediary 120 is software (e.g., an application or extension) executed on a client device 110. An application may be computer software that causes a computer or other device to perform one or more tasks on behalf of client device 110, including the following in an exemplary embodiment. One example of an application may be a web browser, e.g., a software application for requesting, retrieving, presenting, and traversing information resources on the internet or World Wide Web. The web browser may receive web page data files, such as hypertext markup language ("HTML") data files, process the web page data files, and display a web page based on the web page data files.

In one embodiment, an application performs both the requesting, retrieving, presenting, and traversing functions and also acts as intermediary 120 (e.g., where a web browser is custom developed to include the intermediary functions). In alternate embodiments, intermediary 120 is an application executed on a client device that interacts with another application on the same device (e.g., a web browser) via an application programming interface (API) or other method. In another embodiment, intermediary 120 is a specific type of application that can extend another application's function, which enhances or modifies the other application on a client device 110. One example of an extension may be a web browser extension. In either the API or extension embodiment, the intermediary 120 interacts with a web browser and may not need underlying access to the operating system. In these embodiments, intermediary 120 can access the content of websites that users visit and, in some situations, monitor and control some of the operations of a web browser.

In one embodiment, the intermediary 120 may be implemented as software that interacts with subsystems of the operating system (e.g., kernel extension, a dynamic-link library (DLL) file, virtual network adapter, virtual hardware driver, or other native applications or software). This type of software would interface with or "hook into" the operating system or one of its sub-systems (e.g., the networking sub-system) on the client device 110. For example, in the kernel extension example, the kernel extension would be able to access and modify content and requests at the transmission control protocol (TCP) or internet protocol (IP) level (monitoring and modifying packet data).

Figure 1B:
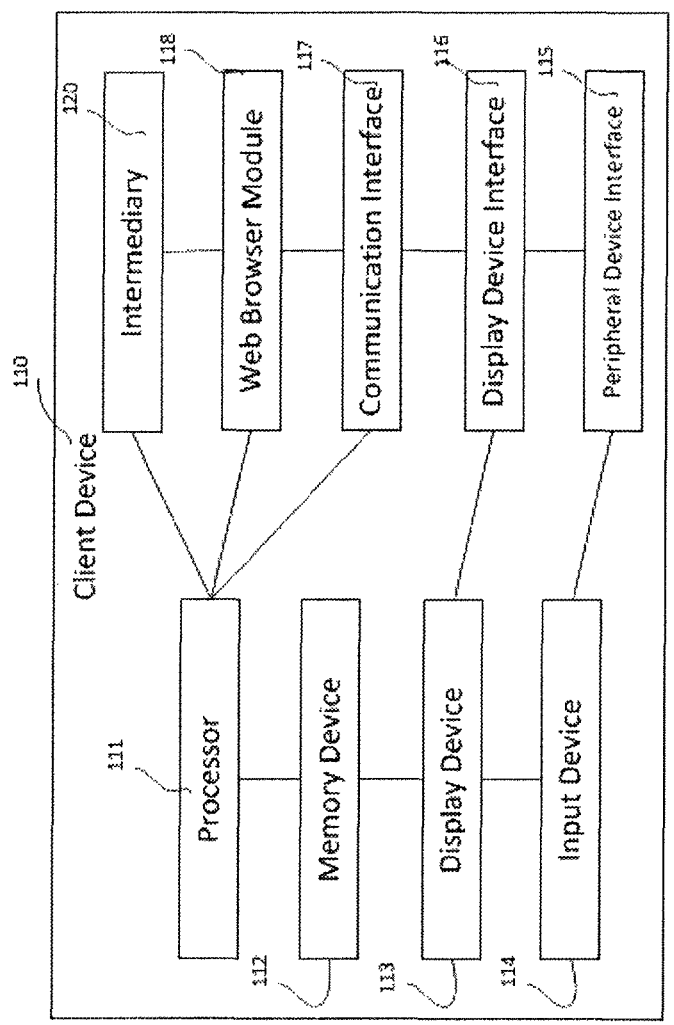
FIG. 1B is a block diagram that illustrates an example client device.

FIG. 1B is a block diagram that illustrates an example client device 110. The client device 110 may be, for example and without limitation, a desktop computer, a laptop computer, a netbook, a tablet computer, a personal digital assistant (PDA), a cellular phone such as a smartphone, or any other appropriate device. The client device 110 may each include a processor 111, a memory device 112, a display device 113, an input device 114, and a web browser module 118, which may be in communication with one another and with any other associated components of the client device 110 using any suitable type of communication device, such as a data bus. The client device 110 may further include an intermediary 120 as may be implemented as a software or hardware component as described herein. The client device 110 may further include a communication interface 117, peripheral device interface 115, display device interface 116, which may be coupled to or included within the other components described above, such as the display device 113 and the input device 114. The intermediary 120 may access the communication interface 117, peripheral device interface 115, display device interface 116, the display device 113, and the input device 114 in accordance with any of the embodiments described herein.

The memory device 110 in the client device 110 may be or include a device such as a Dynamic Random Access Memory (D-RAM), Static RAM (S-RAM), other RAM, a flash memory, or any other suitable computer-readable medium.

The communication interface 117 in the client device 110 may be, for example and without limitation, a communications port, a wired transceiver, a wireless transceiver, or a network card. The communication interface 117 may be capable of communicating using technologies such as Ethernet, fiber optics, microwave, satellite, Public Switched Telephone Network (PTSN), DSL (Digital Subscriber Line), Broadband over Power Lines (BPL), WLAN technology, wireless cellular technology, or any other appropriate technologies.

The peripheral device interface 115 in the client device 110 may be configured to communicate with one or more peripheral devices, such as the input device 114. The peripheral device interface 115 may operate using technologies such as, for example and without limitation, Universal Serial Bus (USB), PS/2, Bluetooth, infrared, serial port, parallel port, or any other appropriate technologies. The peripheral device interface 115 may receive input data from an input device 114 such as a keyboard, mouse, trackball, pointing stick, touch screen, touch pad, stylus pad, or other suitable devices.

The display device interface 116 in the client device 110 may be configured to communicate data to the display device 116. The display device 116 may be, for example and without limitation, a monitor or television display, a plasma display, a liquid crystal display (LCD), or a display based on a technology such as front or rear projection, light emitting diodes (LEDs), organic light-emitting diodes (OLEDS), or Digital Light Processing (DLP). The display device interface 116 may operate using technology such as Video Graphics Array (VGA), Super VGA (S-VGA), Digital Visual Interface (DVI), High-Definition Multimedia Interface (HDMI), or any other appropriate technologies. The display device interface 116 may communicate display data from the processor 111 to the display device 113 to be displayed by the display device 113. The display device 113 may be external to the rest of the client device 110 and coupled to the client device 110 via the display device interface 115. Alternatively, the display device 113 may be included in the client device 110 and may be part of the same component as the input device 114, such as a touch screen display.

The web browser module 118 shown in FIG. 1B may include and/or communicate with one or more sub-modules that perform functionality such as rendering HTML (including HTML5), rendering raster and/or vector graphics, executing JavaScript, and/or rendering multimedia content. The web browser module 118 or its sub-modules may also implement technologies such as Rich Internet Application (RIA), Adobe Flash, Microsoft Silverlight, or any other appropriate multimedia technologies. These multimedia technologies may be implemented using one or more web browser plug-in modules and/or by using one or more sub-modules within the web browser module 118 itself.

In at least one embodiment, the client device 110 may include a configuration. The configuration may be certain settings that cause an existing function or application running on an operating system of the client device 110 to interact with other devices or components based on the configuration settings. In at least one embodiment, a configuration may be Domain Name Server (DNS) configuration, proxy configuration and/or Virtual Private Network (VPN) configuration that causes the client device 110 to send requests to or receive responses through intermediary 120.

In at least one embodiment, the intermediary 120 may include one or more external devices, for performing one or more of the process steps described in more detail below. In one embodiment, an external device is a device external to the client device 110 that may be used to intercept or capture and analyze the requests and/or responses from client device 110.

In at least one embodiment, requests or responses from the client device 110 or first content provider server 130 are transmitted via one or more external devices functioning as a logical intermediary 120 (e.g., although there is a network path that exists between client device 110 and first content provider server 130 that does not include the external device, requests and responses are still routed through the external device). In one embodiment, a configuration on the client device 110 (e.g., the DNS or proxy configuration setting) may allow such external devices to capture and analyze the requests and/or responses from client device 110, by redirecting content, requests for content and/or responses through the external device.

A conventional DNS configuration may work as follows. A user may type in a website name (e.g. http://www.companyabc.com/homepage.html) into a graphical user interface of the client device 110, or a graphical user interface of an application on the client device 110. Then, an application (e.g. a web browser) on client device 110 would receive the website name, generate and send a request to a DNS server (likely one provided by user's ISP): resolve www.companyabc.com to an IP address. The DNS server would respond with publicly documented IP address for Company ABC's web server. The application (e.g. a web browser) then connects to the IP address and then requests Internet content from the server (e.g., by a HTTP "GET" Method). A server of Company ABC would then respond with content where the application (e.g. a web browser) would render the content for display on the graphical user interface of the client device 110. In one embodiment, client device 110 may include a host file that statically maps web server host names to IP addresses. When the host file contains a website name (e.g. www.companyabc.com mentioned above) and an IP address, the client device requests the content from the IP address in the host file and does not request the IP address from a DNS server.

In at least one embodiment, when client device 110 contains a DNS configuration, intermediary 120 may contain one or more devices acting as a DNS server and performing the steps of monitoring and modification described below. In these embodiments, the DNS configuration causes client 110 to perform a lookup for an IP address of first content provider server 130 on a DNS server acting in conjunction with second content provider server 140, which returns an IP address of a device that may perform the monitoring and modification steps. Client device 110 then connects to such device and requests Internet content. The device may then connect to the first content provider to obtain the content and it may monitor, change, or redirect the request or the content received from the first content provider. Alternatively, the device could respond with different content, respond with an instruction for the application to redirect to a different site, or respond with a modified version of the original content.

In at least one embodiment, the intermediary performs the monitoring and modification steps described below using an expressly configured proxy. In one example of this embodiment, client device 110 negotiates a connection to the expressly configured proxy and requests that the proxy request the content from the target HTTP server. The proxy sends the HTTP request to the target server and the target server responds with content. The proxy receives the content and relays the content to client device 110 where the content may be rendered for display on a graphical user interface (GUI) of client device 110 (e.g. a web browser). Examples of this embodiment may include HTTP or socket secure (SOCKs) proxies, among others. The software on the proxy could perform the monitoring and modification steps below on both the requests of client device 110 and the responses of first content provider 130.

In at least one embodiment, client device 110 may contain both a configuration that causes requests for and responses of content to go through intermediary 120 and contain the application serving as intermediary 120 on the same client device, for example as a proxy server running as a background process on client device 110. Thus, when embodiments of intermediary 120 include a configuration on client device 110, such embodiments may contemplate processing only on client device 110, processing only on one or more external devices, or a combination of both.

In at least one embodiment, an external device may function as a physical intermediary (e.g., the external device is a network device operating as a physical intermediary, meaning the external device is communicatively connected as the default network path between the client device 110 and first content provider server 130). In this embodiment, the external device may be a router or a silent proxy (i.e., a device that does not require a special configuration setting). For example, a cable modem or wireless fidelity ("WiFi") router, functioning as an external device, could be programmed with computer software that configures the cable modem or WiFi router to perform the monitoring and modification steps described below. In this embodiment, client device 110 would not need to be specially configured because all of the network traffic would already pass through the external device (e.g., cable modem/router). This embodiment may apply in circumstances in which cable modems or routers are used, such as in homes, hotels, public WiFi areas (e.g., coffee houses), and corporate networks.

Regardless of whether the intermediary is implemented in an external device, a client device 110, or a combination of both, the steps of the methods used in connection with a preferred embodiment of the invention remain largely the same.

Figure 1C:
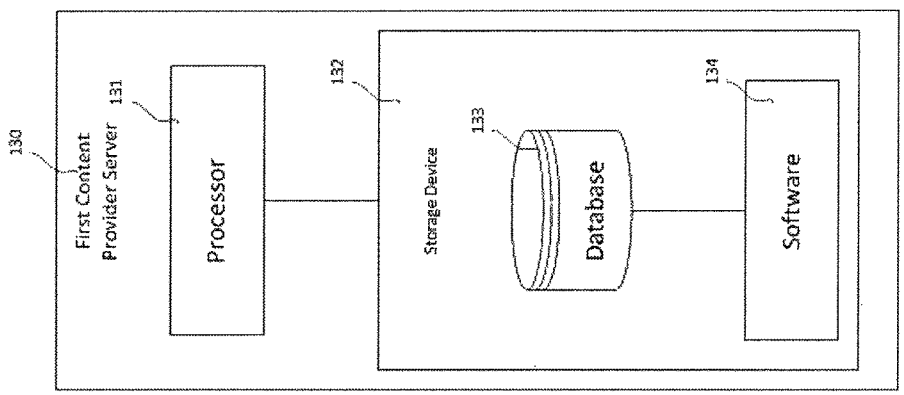
FIG. 1C is a block diagram that illustrates an example content provider server.

FIG. 1C is a block diagram that illustrates an example first content provider server 130. The example of FIG. 1C may also apply to a plurality of content provider servers including, for example, a second content provider server. An example first content provider server 130, may include a processor 131, a storage device 132, a database 133, and software 134. The first content provider server 130 may also be associated with, or incorporated into, any suitable type of computing device, such as, for example and without limitation, a personal computer, a programmable logic controller, or a mobile computing device. The first content provider server 130 may be in communication with one or more client devices 110, which may be directly associated with the first content provider server 130, such as through a direct connection (either wired or wireless) or by being part of the same machine. As discussed above, the storage device 132 of the first content provider server 130 shown in FIG. 1C may include a database 133, which may be spread across one or more non-transitory computer-readable mediums, and may be or include one or more relational databases, hierarchical databases, object-oriented databases, one or more flat files, one or more spreadsheets, and/or one or more structured files. The database 133 may be managed by one or more database management systems, which may be based on a technology such as, for example and without limitation, Microsoft SQL Server, MySQL, PostgreSQL, Oracle Relational Database Management System (RDBMS), a NoSQL database technology, or any other appropriate technologies. The database 133 may include a number of different types of data that are used by the first content provider server 130, which may be in communication with the intermediary 120 over a network 150 including but not limited to the Internet, a wireless local area network (WLAN), and/or a cellular network. The database 133 may further be in communication with a software 134 of the first content provider server 130, which may operate in conjunction with the intermediary 120, or make up a component of the intermediary 120.

An instance of the exemplary client device 110 and first content provider server 130 and second content provider server 140 shown in FIG. 1, may be configured to perform any feature or any combination of features and methods described herein. Alternatively or additionally, the memory device 112 of the client device 110 and/or the storage device 132 of server 130, 140 respectively may store instructions which, when executed by the processor 111, 131, cause the processor 111, 131 to perform any feature or any combination of features and methods described herein. Furthermore, each or any of the features and methods described herein may be performed by the processor 111, 131 in conjunction with the memory device 112, web browser module 118, communication interface 117, peripheral device interface 115, display device interface 116, and/or storage device 132. Specifically, the client device 110 may be used to run the intermediary 120, and first content provider server 130 and/or second content provider server 140 may be in communication with the intermediary 120 over the network 150.

As used herein, the term "processor" in reference to the processors 111, 131 of broadly refers to any unit, module, or machine capable of executing a sequence of instructions, such as, for example and without limitation, a single-core or multi-core processor, a general purpose processor, a special purpose processor, a conventional processor, a Graphics Processing Unit (GPU), a digital signal processor (DSP), one or a plurality of microprocessors, one or more microprocessors associated with a DSP core, a controller, a microcontroller, one or more Application Specific Integrated Circuits (ASICs), one or more Field Programmable Gate Array (FPGA) circuits, any other type of integrated circuit (ID), a system-on-a-chip (SOC), a Complex Instruction Set Computer (CISC), a Reduced Instruction Set Computer (RISC), or a state machine.

As used herein, the term "non-transitory computer-readable storage medium" broadly refers to any storage medium that may store or transfer information, including volatile, nonvolatile, removable, and non-removable media. Examples of a computer-readable medium include, but are not limited to, a register, a cache memory, an electronic circuit, a fiber optic medium, a Read Only Memory (ROM), Erasable Programmable ROM (EPROM), Electrically Erasable Programmable ROM (EEPROM), a semiconductor memory device (such as a D-RAM, S-RAM, or other RAM), a magnetic medium (such as a hard disk drive, a tape drive, a magneto-optical medium, or a floppy drive), a flash memory medium (such as a USB flash drive or a flash memory card) or other solid state memory technology, a flash based or D-RAM based solid-state drive (SSD), an optical disk (such as CDs, DVDs, or BDs), or other optical storage, magnetic cassettes, magnetic tape, magnetic disk storage or other magnetic storage devices, or any other medium suitable device for electronic data storage which can be used to store the desired information and which can be accessed by the computer system and/or instructions executable by a computing device.

Although the methods and features of the present application were described herein as performed using the example architecture of FIGS. 1A-1C the present method and features may be performed, mutatis mutandis, using any appropriate architecture or environment. For example and without limitation, the methods described herein may be implemented using cloud computing technologies. Additionally, the components of the example first content provider server 130 may be included as part of, or the same components as, those of the client device 110, such that the steps and operations described below as being performed by the example first content provider server 130 are performed locally on the client device 110 instead. Furthermore, although the web browser module 118 in the client device 110 is described herein as implementing specific web browser technologies, it should be understood that the features described herein as performed by the web browser module 118 may alternatively or additionally be implemented using a specific purpose application, including but not limited to an application that is configured to run on an operating system such as Microsoft Windows, Apple OS X, Unix, Linux, Android, Windows Mobile, Apple iOS, or any other appropriate general purpose or mobile operating system.

In one embodiment, the system 100 according to at least one embodiment of the invention includes one or more computers having one or more processors and memory (e.g., one or more nonvolatile storage devices). In some embodiments, memory or computer readable storage medium of memory stores programs, modules and data structures, or a subset thereof for a processor to control and run the various systems and methods disclosed herein. In one embodiment, a non-transitory computer readable storage medium having stored thereon computer-executable instructions which, when executed by a processor, perform one or more of the methods disclosed herein.

Figure 2:
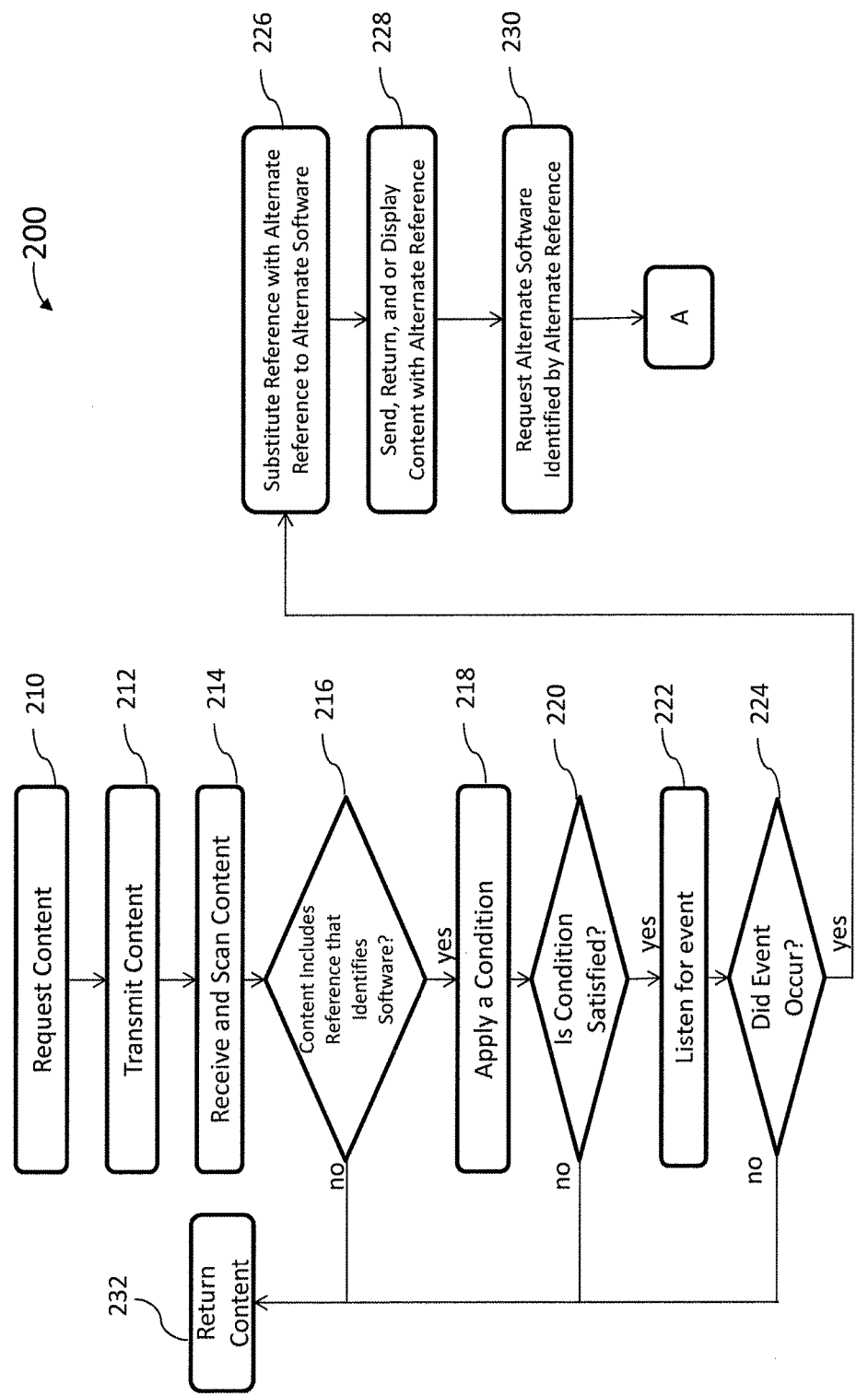
FIG. 2 is a flow diagram that illustrates an exemplary method for providing alternate content downloads by modifying content of a response according to at least one embodiment of the present invention.

FIG. 2 is a block diagram that illustrates a method 200 for providing alternate content or software by monitoring and modifying the content of a response according to at least one embodiment of the present invention.

In at least one embodiment, content may be internet content such as a data file used for displaying a web page in a web browser on client device 110. Alternatively, in at least one embodiment, content may be any type of request for information over the Internet. Further, in at least one embodiment, content may be a connection to a web server to receive HTML files, executable files, javascript files, and/or images. Moreover, in at least one embodiment, content originated from a request for a file from a file transfer protocol (FTP) server, for an email from an email server, or a request for a file from a desktop or mobile app store.

At step 210, in response to a user action on client device 110, a program (e.g. a web browser or app store client) running on client device 110, may request content from first content provider server 130. In one embodiment, content (e.g. internet content or a web page data file) may include a reference that identifies software. A reference may be any type of reference that permits the downloading of software. In at least one embodiment, the reference may be a uniform resource locator ("URL"). A URL may be a web address or a specific character string that constitutes a reference to a resource on the internet or World Wide Web. In at least one embodiment, the identified software may be a file that causes a device to perform indicated tasks according to encoded instructions associated with the software.

At step 212, first content provider server 130 may transmit the content (e.g. web page data file or app store content) to client device 110 via or utilizing intermediary 120.

At step 214, the intermediary 120 may receive or otherwise monitor the content (e.g. web page data file or app store content) and parse the content for references (e.g. a URL) that identify initial software. This may include parsing data associated with the content.

There are a number of ways that the content can reference software and instruct the client device 110 to download the initial software. In one embodiment, a string comparison between a predefined string and each line or segment of the content is performed to identify a reference. If a match is found, then the method 200 advances to step 216; otherwise, the method advances to step 232, where the intermediary may send or return the content to client device 110. In one exemplary embodiment, a string comparison is performed on an HTML document, with the string comparison identifying references based on HTML tags, XML tags, or Java Script Object Notation (JSON), for example. In another embodiment, the content will be searched for specific elements or components likely to contain references to software. In one exemplary embodiment, the document object model of an HTML document will be traversed for link tags that contain a URL referencing software. Other examples of search algorithms or functions contemplated for use by one or more embodiments in one or more steps of the invention may include regular expressions, substring searches, or fuzzy searches.

In an alternative embodiment, the reference to initial software may be implemented using Java script code. In the event that the user performs some type of user action on a web page, the Java script code may generate a dynamic reference to software.

At step 216, the intermediary 120 may determine whether the reference (e.g. a URL) identifies initial software. In one exemplary embodiment, a string comparison may be performed to determine if the reference identifies software. For example, in an HTML document, an intermediary may look for references to files ending in ".exe", ".dmg", ".pkg", and/or ".java", for example. Other file extensions or methods for identifying software are contemplated by different embodiments of this invention.

If the reference (e.g. a URL) does not identify initial software, then the intermediary 120 may transmit or return the content (e.g. web page data file or app store content) to client device 110.

If the reference (e.g. a URL) identifies initial software, then the method may advance to step 218, or advance to step 222 or step 226 according to different embodiments of the invention. At step 218, the intermediary 120 may apply a predetermined condition to determine whether to provide alternate or recommended software by modifying the content (e.g. web page data file) or by substituting a reference to the initial software (e.g. a URL) with an alternate reference to alternative software (e.g. an alternate URL to alternate software). One or more examples of predetermined conditions may include (1) a user or device characteristic, (2) a date/time-related attribute, (3) characteristics of the intermediary or configuration, such as an extension, (4) content provider characteristics, such as a website, (5) characteristics of the distribution or marketing partners or their software, or (6) a user action. General examples of different predetermined conditions may include (1) the time when an extension or software was installed, (2) the time a certain file or software was downloaded or replaced, (3) the time of day, (4) white list/black list of domains, file names, and/or content owners, (5) types of advertising units, formats, or settings that are enabled, (6) other software installed on a client device 110, (7) the user's consent, either generally or at each time there is an opportunity to provide alternate software.

Examples of a user or computer characteristic that may be used as a predetermined condition include one or more of: Operating System Type (e.g., Windows or Mac), Operating System Version, IP Address, Web Browser Type, and/or geographic location of a user and/or client device 110. For example, some advertisers may only be interested in offering software to Windows users. By way of further example, a company may find that certain software advertisements work better for certain web browsers, or geographies, or some other characteristic and the downloads are modified/redirected accordingly.

If the intermediary 120 performing the method is executed on client device 110 (e.g. kernel, DLL, background process, extension), then the intermediary has access to information describing client device 110 (e.g. Windows or Mac, Operating System Version, IP Address, Web Browser Type, and/or geographic location of a user and/or client device 110) and would be able retrieve this information from client device 110. If the intermediary 120 is executed remotely, then the intermediary 120 would obtain the information on client device 110 by way of information transmitted between the client device 110 and the intermediary 120 (e.g. Internet networking including an IP address if the content is being transmitted over HTTP, the HTTP headers likely containing most of this information (e.g. OS, IP Address, Browser type)).

An example of a date/time-related attribute used as a predetermined condition may be that the modification is only performed if the request is made between 9 am-5 pm EST. Advertisers may wish to only present users with an offer to download software between certain times, on certain days.

Examples of characteristics of an extension used as a predetermined condition may include the software installed on the user's computer or device and/or the number of days the software has been installed. The software installed on the user's computer may only have certain features turned on or off or may have specific restrictions. Sometimes, distribution partners will only agree to certain types of advertising. Thus, for example, if they opt out of using the methods of the present invention, then the references for initial software (e.g. URLs) will not be replaced or modified for downloadable software for the consumers of products for those distribution partners. Other partners may wish to only have replacement performed on certain websites or, conversely, identify a list of websites where they do not want replacement to occur.

For the example in which the characteristic is the number of days installed, a company may only wish to stage the introduction to advertising units over time, and may permit alternate software to be provided for the first 30 days or, conversely, the company may wait until after 30 days has elapsed.

An example of a website characteristic used as a predetermined condition is the domain or specific page on the website being requested by client device 110, and would be used for black and white listing. In one embodiment, a black list may be a specific list of websites where the client device 110 is prohibited from receiving alternate software. In one embodiment, a white list may be a specific list of websites where the client device 110 is allowed to receive alternate software.

An example of a distribution or marketing partner characteristics used as a predetermined condition may include specific requirements of some particular partner. For example, some partners may indicate that provisions of alternate software cannot be performed on specific sites or that provisions of alternate software can only be performed on specific sites. In other instances, the partner may indicate it only supports certain browsers, operating systems, or devices.

In certain embodiments, the invention accounts for situations in which a company is concerned with user experience and, thus, wants to limit the number and types of advertising. For example, the invention may be used to allow users to experience multiple types of advertising or modifications to references on a website, or to prevent users from experiencing any advertising or modifications to references on a website.

Turning back to FIG. 2, at step 220, if one of the predetermined conditions is not satisfied, then the method 200 advances to step 232. In step 232, the intermediary 120 may send, or return, the content (e.g. a web page data file) with no modifications or substitutions to client device 110. If the predetermined conditions are satisfied, then the method 200 advances to steps 222 or 224, according to different embodiments of the invention.

At step 222, the intermediary 120 may listen for a user, timed, independent, or dependent event to occur. For example, types of events that an intermediary may listen for may include: a user click, scroll, hover, time elapsing, and/or typing a key on the keyboard.

At step 224, if an event does not occur, then the method advances to step 232, where the intermediary 120 may send, or return, the content (e.g., a web page data file) to client device 110.

However, if an event occurs, the method 200 advances to step 226. Further, in one embodiment, if the intermediary 120 is an extension (or a background process), the method 200 may advance to step 226 after a random or predetermined amount of time after a user clicks or upon the user scrolling.

At step 226, the intermediary 120 may substitute a reference (e.g., a URL) that identifies initial software with an alternate reference (e.g., an alternate URL) that identifies alternate software, where the alternate software is different from the initial software identified by the original reference. The alternate software may also be a combination of various software products and include the initial software.

In one embodiment, the intermediary 120 may substitute a reference that identifies initial software with an alternative reference that identifies alternate software via a text substitution. For example, if the original reference recited: http://www.example.com/files/downloadfile.exe, the original reference is replaced with the following alternate reference: http://www.server2.com/download.exe?originalURL=http%3A%2F%2Fwww.example.com%2Ffiles%2Fdownloadfile.exe&optionalVariable=43543534&optionalVariable2=sdfsdf. In this example, the alternate reference (e.g. a URL to second content provider server 140) includes the original reference to the original content and one or more variables (e.g., a tracking identifier). However, alternative embodiments contemplate having no variables or different combinations of variables.

In one embodiment, the alternate reference (e.g. an alternate URL) may include alternate software as a data element embedded in the alternate reference. When a request is received, the intermediary 120 retrieves the alternate software embedded in the alternate reference and provides the alternate software to the client device 110.

At step 228, the intermediary 120 may send, return, and/or display content with an alternate reference that identifies alternate software to a client device 110. In one embodiment, a web browser may display the content as a web page. In an alternate embodiment, an app store may display the content within the app store application. In another embodiment, the alternate reference may be sent to the client device.

At step 230, a client device 110 may receive a user selection of the alternate reference (e.g. an alternate URL) and request alternate software identified by the alternate reference. The second content provider server 140 or intermediary 120 may receive the request and transmit the alternate software to the client device 110.

In one embodiment, a user event may occur that triggers the request for the alternate software identified by the alternate reference. Examples of user events may include: a click by a user, a hover over, a timer, and a refresh of a page.

After step 230, the method 200 may advance to the method 400 described below and shown in FIG. 4.

Figure 3:
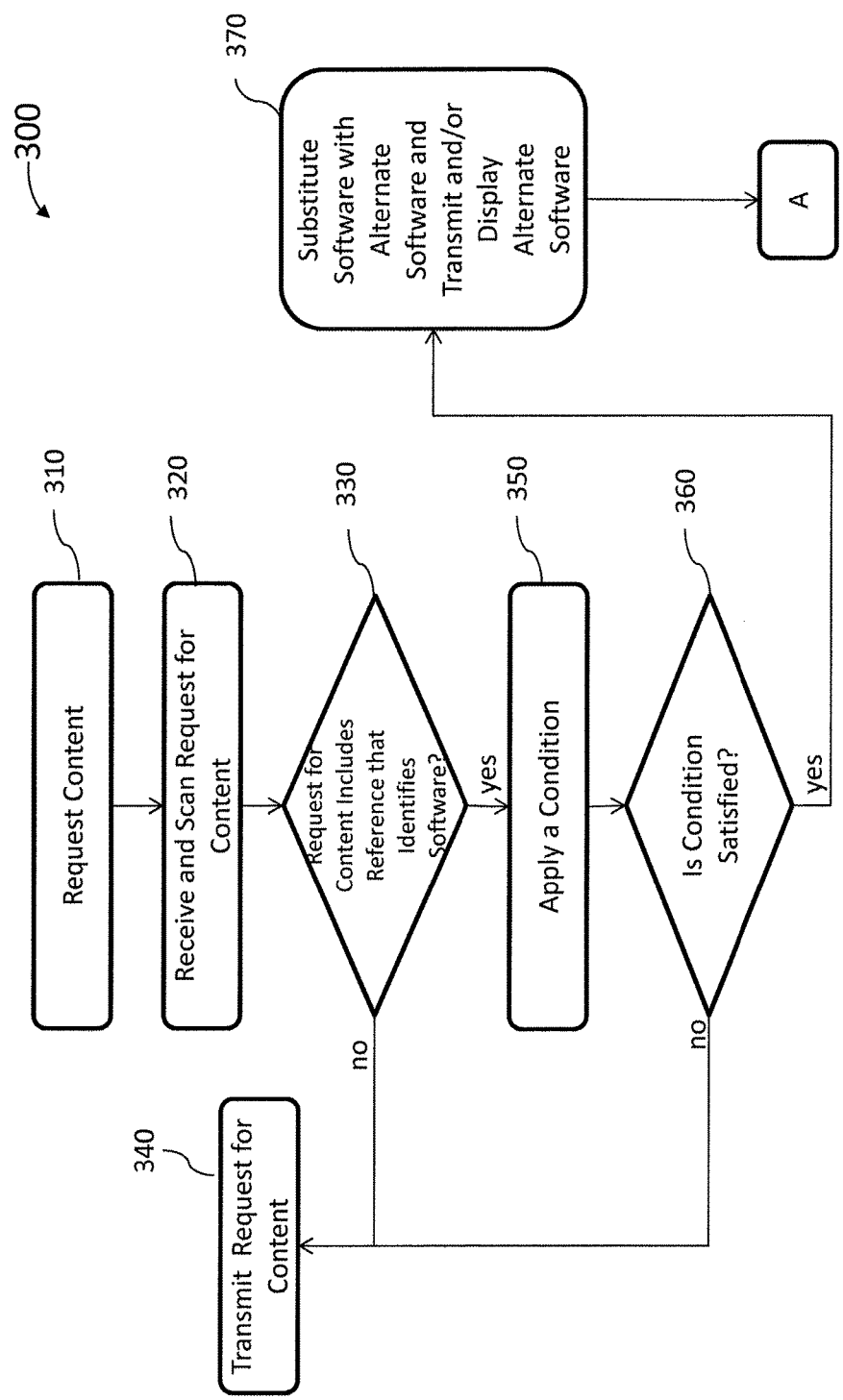
FIG. 3 is a flow diagram that illustrates an exemplary method for providing alternate content downloads by intercepting a request for content according to at least one alternate embodiment of the present invention.

FIG. 3 is a flow diagram that illustrates a method 300 for providing alternate content downloads by intercepting or analyzing a request for content according to at least one embodiment of the invention. In at least one embodiment, the request for content is a request to download initial software.

The method 300 begins at step 310, where a client device 110 generates and transmits a request for content to first content provider server 130 via intermediary 120.

In one embodiment, the request for content (e.g. a request for initial software) may be a HTTP request message from client device 110 to first content provider server 130, such as an HTTP GET Method.

An intermediary 120 in method 300 monitors the server name, path, and file name of the GET request, evaluates whether provision or suggestion of alternate software is warranted, and, if so, redirects to second content provider server 140 or responds on behalf of the first content provider server 130. This may occur at the browser level, computer level or network level (e.g., using an external device such as a proxy).

In one embodiment, the request for content includes a reference (e.g. a URL) that identifies initial software.

At step 320, the intermediary 120 receives and parses the request for content. This may include parsing data associated with the request for content.

At step 330, the intermediary 120 determines whether the request for content includes a reference that identifies initial software.

If the request for content does not include a reference to initial software, then the method 300 advances to step 340, where the intermediary 120 transmits the request for content to first content provider server 130. Content provider server 130 may then process the request for content and transmit the content to client device 110.

If the request for content includes a reference to initial software, then the method 300 advances to step 350 or step 370 according to different embodiments of the invention. At step 350, the intermediary 120 may apply a similar predetermined condition, as described above in method 200 and FIG. 2.

At step 360, if the predetermined condition is not satisfied, the intermediary 120 transmits the request for content to first content provider server 130, as described in step 340.

If the predetermined condition at step 360 is satisfied, at step 370, the intermediary 120 transmits the request for content to a different location (e.g. second content provider server 140), which substitutes the content (e.g. initial software) for alternate content (e.g. alternate software) before transmitting the alternate content to client device 110 and displaying the alternate content. Alternatively, the intermediary 120 may substitute the content with alternate content before transmitting the alternate content to client device 110, at step 370. In one embodiment, the alternate content (e.g. alternate software) may be different from the content (e.g. initial software) identified by the request, or may include the content (e.g. initial software) identified by the request in addition to new content (e.g. additional recommended software).

In at least one embodiment, if the intermediary 120 is an extension on client device 110, the intermediary 120 may change a URL before a web browser, for example, makes the actual HTTP request.

In at least one embodiment, the intermediary 120 could instead respond with an instruction for the web browser (or other application) on client device 110 to redirect to second content provider server 140, where the client device 110 would then make a second request to retrieve the alternate content.

In at least one embodiment, the intermediary 120 may request the alternate content (e.g. alternate software) from second content provider server 140 before transmitting the alternate content to the client device 110.

In at least one embodiment, the alternate software may include a reference (e.g., a URL) to the initial software originally targeted by the client device 110. In this embodiment, once the alternate software is downloaded and executed, the alternate software will cause the client device 110 to download the initial software identified by the reference (e.g. a URL).

FIG. 4 illustrates an exemplary method 400 for installing the alternate software on client device 110.

At step 410, a client device 110 downloads the alternate software from the second content provider server 140 or intermediary 120. In one embodiment, after the second content provider server 140 receives a request for content, the second content provider server 140 then creates a specialized version of alternate software that includes the reference to the initial software. In one embodiment, the reference is a text file in the installation package that contains the URL to the target software. The alternate software then processes the text file, extracts the reference, and downloads the initial software. In an alternative embodiment, the second content provider server 140 has already created the specialized package of the alternate software that includes the reference to the initial software.

At step 420, the client device 110 executes the alternate software.

At step 430, the alternate software displays or presents one or more advertisements or offers to install different software on the client device 110. In one embodiment, installation of the alternate software may be required. In one embodiment, installing alternate software may be optional as either an opt-in or opt-out option. These options provide an opportunity, if they offered in, for the user to find additional software that they might find interesting and to generate advertising revenue for software already installed on the users' computers.

At step 440, the initial software originally targeted by the client device 110 may be downloaded and installed on client device 110 using a reference provided with the specialized package that included the alternate software. In one embodiment, once the alternate software is downloaded and executed, the alternate software may cause the client device 110 to download the initial software from first content provider server 130. In an alternative embodiment, the alternate software may include the initial software originally targeted by the client device 110.

In at least one embodiment, the alternate software may include other information, such as a tracking code/identifier. A tracking code/identifier may be used to pass information to a software executable installer, which can then transmit the tracking code/identifier along to second content provider server 140, which bundles the tracking code/identifier with alternate software before distributing the software to client device 110.

In at least one embodiment, the tracking code/identifier may be an alphanumeric string that the second content provider can correlate to other data in the second content provider's backend system. In at least one embodiment, the tracking code/identifier could be used to identify a business partner (i.e. a third party) whom the second content provider should attribute some of the revenue generated or to some grouping of users the second content provider wishes to track. In at least one embodiment, the tracking code/identifier may identify a reference to alternate software, indicating that alternate software was downloaded by a client device 110.

In at least one embodiment, tracking code/identifier may be used to measure profitability, attribute revenue or success, identify trends, run statistical analysis, or most generally, to associate other information with the running of an executable installer and determine whether users successfully installed the software the second content provider offers them. For example, users may be grouped into logical groupings defined by certain parameters and then counted as a whole to track installations and related revenues on a group-by-group basis. For example, one logical grouping could be users who first installed the software on Jan. 1, 2013, through Distribution Partner XYZ, and who are located in the U.S. A company would then be able to track how many times the users in that group were presented with offers to install software through a software executable installer, the conversion (i.e., how much of the software a user actually installed), and how much advertising revenue the company generated from the users installing the new software. The company can then determine, e.g., some distribution partners have users that generate more revenue than others, or that users located in the U.S. (vs. England) generate more revenue, or that users who install software on Mondays earn more revenue, or that most revenue is made in the first 10 days a user has the software installed.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A method performed by an intermediary for generating advertising revenue by providing alternate software in response to a request for software by a user of a client device, the method comprising:
   receiving data associated with a request for an initial software from a client device in the form of a Uniform Resource Locator (URL), wherein the intermediary is a separate entity from the source of the initial software;
   parsing the data associated with the request for the initial software for reference to one or more specific file types;
   on a condition that a first file type is found in the parsed data, determining whether to provide alternate software based on a predetermined condition;
   on a condition that the predetermined condition is met, substituting the request for the initial software URL with a request for an alternate software URL and sending a request to the alternate software URL for an alternate software, wherein the alternate software comprises content that is not present in the initial software, and wherein the installation of the content that is not present in the initial software is associated with advertising revenue;
   receiving the alternate software based on the request for alternate software from a source different than the initial software URL;
   sending the alternate software to the client device; and
   on a condition that the alternate software is downloaded to the client device, separately presenting the initial software and the content not present in the initial software to the client for installation, and on a condition that the content not present in the initial software is installed, receiving tracking information related to advertising revenue associated with the installation of or advertisements displayed by the alternate software.

2. The method of claim 1, wherein the predetermined condition comprise one or more of: a client device characteristic, date/time attribute of the initial software request, a specific content provider, an operating system type, a web browser type, a geographic location, an IP address, and a domain name.

3. The method of claim 1, further comprising:
   determining the client device installed the alternate software; and measuring a number of alternate software installations based on the number of tracking identifiers.

4. The method of claim 1, wherein the initial software is associated with a first content provider and the content not present in the initial software is associated with a second content provider, and wherein the content not present in the initial software constitutes or displays advertisements associated with the second content provider through which advertising revenue is paid to the intermediary.

5. The method of claim 1, wherein sending the alternate software to the client device further comprises:
upon a predetermined amount of time passing from the user scrolling, sending an indication of the alternate software in an app store to the client device;
receiving an indication of a user selection from the client device and requesting the alternate software from the app store; and, returning the alternate software to the client device for installation.

6. The method of claim 1, wherein the one or more file types include exe, dmg, pkg, and java.

7. The method of claim 1, wherein the intermediary is physically separate from the client device and the source of the alternate software.

8. The method of claim 1, wherein the intermediary is a piece of software on the client device.

9. The method of claim 1, further comprising sending instructions to the client device to present an option to opt-in for the alternate software, and to receive a selection of the option to opt-in for the alternate software from the client device, wherein the alternate software is for the client device.

10. An intermediary computing device for generating advertising revenue comprising:
a communication interface coupled to a processor, the communication interface and processor configured to receive data associated with a request for an initial software from a client device in the form of a Uniform Resource Locator (URL), wherein the intermediary is a separate entity from the source of the initial software;
the processor and the memory further configured to parse the data associated with the request for the initial software for reference to one or more specific file types;
on a condition that a first file type is found in the parsed data, the processor is further configured to determine whether to provide alternate software based on a predetermined condition;
on a condition that the predetermined condition is met, the processor and communications interface is further configured to substitute the request for the initial software URL with a request for an alternate software URL and send a request to the alternate software URL for an alternate software, wherein the alternate software comprises content that is not present in the initial software and the installation of the content that is not present in the initial software is associated with advertising revenue;
the communication interface and processor further configured to receive the alternate software based on the request for the alternate software from a source different than the initial software URL and send the alternate software to the client device; and
on a condition that the alternate software is downloaded on the client device, the communication interface and processor being further configured to separately present the initial software and the content not present in the initial software to the client for installation, and on a condition that the content not presented in the initial software is installed, to receive tracking information related to the advertising revenue associated with the installation of the alternate software.

11. The intermediary computing device of claim 10, wherein the predetermined condition comprise one or more of: a client device characteristic, date/time attribute of the initial software request, a specific content provider, an operating system type, a web browser type, a geographic location, an IP address, and a domain name.

12. The intermediary computing device of claim 10, further comprising:
the communication interface is further configured to send instructions to the client device to present an option to opt-in for the alternate software, and to receive a selection of the option to opt-in for the alternate software from the client device.

13. The intermediary computing device of claim 10, further comprising:
determining the client device installed the alternate software; and
measuring a number of alternate software installations based on the number of tracking identifiers.

14. The intermediary computing device of claim 10, wherein the initial software is associated with a first content provider and the content not present in the initial software is associated with a second content provider, and wherein the content not present in the initial software constitutes or displays advertisements associated with the second content provider.

15. The intermediary computing device of claim 10, wherein the intermediary computing device is physically separate from the client device and the source of the alternate software.

16. The intermediary computing device of claim 10, wherein sending the alternate software to the client device further comprises:
upon a predetermined amount of time passing from the user scrolling, the processor and communications interface further configured to send an indication of the alternate software in an app store to the client device;
the processor and communications interface further configured to receive an indication of a user selection from the client device, request the alternate software from the app store, and return the alternate software to the client device for installation.

17. The intermediary computing device of claim 10, wherein the one or more file types include exe, dmg, pkg, and java.

18. A non-transitory computer-readable storage medium with stored instructions for generating advertising revenue through providing alternate software, the stored instructions executed by one or more processors operatively coupled with a communications interface and a display, the instructions comprising:
instructions to intercept data associated with a request for an initial software at a transmission control protocol or an internet protocol level in the form of a Uniform Resource Locator (URL), wherein the intermediary is a separate entity from the source of the initial software;
instructions to parse the data associated with the request for the initial software for reference to one or more specific file types;
on a condition that a first file type is found in the parsed data instructions to determine whether to provide alternate software based on a predetermined condition;
on a condition that the predetermined condition is met, instructions to substitute the request for the initial software URL with a request for an alternate software URL and instructions to send a request to the alternate software URL for an alternate software, wherein the alternate software comprises content that is not present in the initial software, and wherein the installation of the content that is not present in the initial software is associated with advertising revenue;

instructions to receive the alternate software and advertisement data from the server different than the initial software URL;

instructions to send the alternate software to the client device; and on a condition that the alternate software is downloaded on the client device, instructions to separately present the initial software and the content not present in the initial software to the client for installation, and on a condition that the content not present in the initial software is installed, instructions to receive tracking information related to the advertising revenue associated with the alternate software.

* * * * *